United States Patent
Gollek et al.

(10) Patent No.: US 10,047,907 B2
(45) Date of Patent: Aug. 14, 2018

(54) PANELING FOR CIRCULATING MACHINES WITH PERIPHERAL INTERCHANGEABLE MODULES

(71) Applicant: KHS GmbH, Dortmund (DE)

(72) Inventors: Hanno Gollek, Dortmund (DE); Klaus Krämer, Dortmund (DE)

(73) Assignee: KHS GmbH, Dortmund (DE)

( * ) Notice: Subject to any disclaimer, the term of this patent is extended or adjusted under 35 U.S.C. 154(b) by 19 days.

(21) Appl. No.: 14/913,121

(22) PCT Filed: Aug. 13, 2014

(86) PCT No.: PCT/EP2014/067373
§ 371 (c)(1),
(2) Date: Feb. 19, 2016

(87) PCT Pub. No.: WO2015/024843
PCT Pub. Date: Feb. 26, 2015

(65) Prior Publication Data
US 2016/0201849 A1 Jul. 14, 2016

(30) Foreign Application Priority Data
Aug. 20, 2013 (DE) .................. 10 2013 109 004

(51) Int. Cl.
*B65B 43/50* (2006.01)
*F16P 1/02* (2006.01)
*B65C 9/00* (2006.01)

(52) U.S. Cl.
CPC ............... *F16P 1/02* (2013.01); *B65B 43/50* (2013.01); *B65C 9/00* (2013.01)

(58) Field of Classification Search
CPC ....... F16P 1/00; F16P 1/02; F16P 3/02; B65B 43/50; B65B 43/52; B65B 43/42;
(Continued)

(56) References Cited

U.S. PATENT DOCUMENTS

| 1,256,179 A | * | 2/1918 | Smith | ........................ | F16P 1/02 |
| | | | | | 74/609 |
| 3,361,189 A | | 1/1968 | Dixon et al. | | |

(Continued)

FOREIGN PATENT DOCUMENTS

| DE | 89 05 839 | 9/1990 |
| DE | 203 02 578 | 4/2003 |

(Continued)

OTHER PUBLICATIONS

Magnetic Catch for Inset Doors, available Nov. 17, 2013; accessed Oct. 24, 2016 from http://www.rockler.com/magnetic-catch-for-inset-doors.*

(Continued)

*Primary Examiner* — Katherine W Mitchell
*Assistant Examiner* — Jeremy C Ramsey
(74) *Attorney, Agent, or Firm* — Occhiuti & Rohlicek LLP

(57) ABSTRACT

A container processing installation includes a carousel with processing modules disposed around a periphery thereof, each pair of adjacent processing modules being separated a screened gap. The screen that screens this gap is a multi-part panel arrangement having a first panel mounted to a processing module such that it can swivel and a second panel having a connector mounted thereon. This connector interacts with a counter-connector that is either on an adjacent second processing module or on the container-processing installation.

22 Claims, 6 Drawing Sheets

(58) Field of Classification Search
CPC ..... E06B 2009/002; B23Q 11/08; B65C 9/00; B32B 41/00; F16C 3/22; B29C 49/42
USPC ........ 160/135, 229.1, 231.1, 231.2; 156/538, 156/556; 74/612
See application file for complete search history.

(56) References Cited

U.S. PATENT DOCUMENTS

| | | | | |
|---|---|---|---|---|
| 5,154,273 | A * | 10/1992 | Macomber | B65G 17/066 198/321 |
| 6,474,120 | B1 * | 11/2002 | Wadsworth | E05B 63/185 292/251.5 |
| 6,708,956 | B1 * | 3/2004 | Mangelsen | B23Q 11/08 256/24 |
| 9,102,433 | B2 * | 8/2015 | Cordioli | B65C 9/00 |
| 2012/0039692 | A1 | 2/2012 | Giuliani et al. | |
| 2013/0139970 | A1 | 6/2013 | Cordioli | |
| 2013/0317280 | A1 * | 11/2013 | Cheng | A61N 2/02 600/13 |
| 2014/0318721 | A1 * | 10/2014 | Pedersen | E06B 9/0638 160/210 |

FOREIGN PATENT DOCUMENTS

| | | |
|---|---|---|
| DE | 10 2011 054890 | 5/2013 |
| EP | 1 449 809 | 8/2004 |
| EP | 1 754 663 | 2/2007 |
| WO | WO2010/099822 | 9/2010 |
| WO | WO2011/018808 | 2/2011 |
| WO | WO2011/154980 | 12/2011 |
| WO | WO2012/019824 | 2/2012 |
| WO | WO2013/001551 | 1/2013 |

OTHER PUBLICATIONS

Banner Hinge Safety Interlock Switches, published Mar. 31, 2008, accessed Oct. 24, 2016 from http://www.designworldonline.com/banner-hinge-safety-interlock-switches/#_.*

FAQ-Frequently Asked Questions What is the difference between the combination magnet-magnet and magnet-iron?; Accessed May 4, 2107 from https://www.supermagnete.de/eng/faq/What-is-the-difference-between-the-combination-magnet-magnet-and-magnet-iron.*

Hinge Winge Safety Interlock Switches; Accessed May 4, 2017 from http://www.c1rwtr.com/PDF/Banner/Banner-SI-HG63-Series-Switches.pdf.*

Aubert&Duval X17CrNi16-2/X22CrNi17 steel properties; Accessed May 4, 2017 from http://www.aubertduval.com/uploads/tx_obladygestionproduit/gb_APXV.pdf.*

* cited by examiner

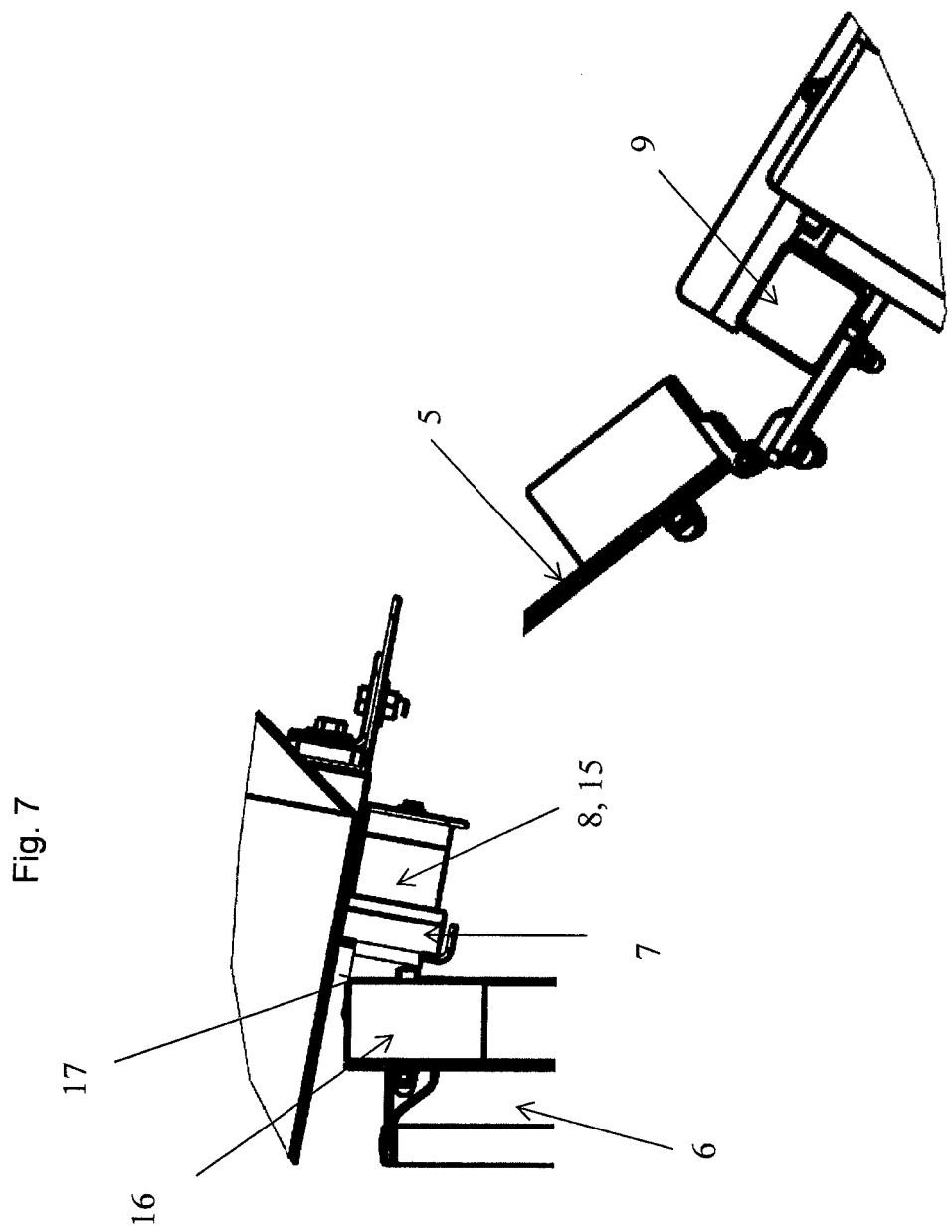

PANELING FOR CIRCULATING MACHINES WITH PERIPHERAL INTERCHANGEABLE MODULES

RELATED APPLICATIONS

This is the national stage of PCT/EP2014/067373, filed on Aug. 13, 2014, which claims the benefit of the Aug. 20, 2013 priority date of German application DE 10 2013 109 004.4, the contents of which are herein incorporated by reference.

FIELD OF INVENTION

The invention relates to a container processing installation having a rotating carousel with container-processing modules arranged on a peripheral circumference thereof, and in particular, to screening the space between the container-processing modules.

BACKGROUND

Container processing machines often include a rotating carousel. The carousel has processing modules arranged around a periphery thereof. Between each pair of processing modules is a space.

SUMMARY

It is useful to provide screens in the spaces between pairs of processing modules. Such screens serve two purposes. First, they discourage personnel from inserting limbs into the movement range of the carousel. Second, they protect personnel against containers that may become loose during operation. These containers might otherwise be flung out of the carousel and injure bystanders.

In one aspect, the invention features a container-processing installation having a rotating carousel with processing modules arranged around a peripheral circumference thereof. These processing modules process containers. An inter-module gap separates each pair of processing modules. Within each gap is multi-part panel arrangement that forms a screen. One of the panels of this panel arrangement connects to one side to the processing installation and/or to one of the processing modules. Another panel in this panel arrangement has connectors that interact with corresponding counter-connectors that are arranged on the processing installation and/or immediately adjacent to the processing module.

In some embodiments, the extent of the panel arrangement is greater than the inter-module gap to be screened. In these embodiments, the panels define an angle between them. This is advantageous because it means that a panel arrangement can be adjusted to screen inter-module gaps of different sizes, provided the sizes are within the tolerance defined by the panel arrangement's geometry.

In some embodiments, the panel arrangement is arranged on the processing module so that it can be pivoted in one direction. In such embodiments, the counter-connectors are arranged on an adjacent processing module. In this way, the panel arrangement can close the inter-module gap in the simplest way.

Other embodiments achieve a unilaterally pivotable connection of the panel arrangement to the processing module by having a tie bar of the panel arrangement be secured rigidly to the processing module. For example, the tie bar may be screwed to the processing module. A first panel connects to this tie bar in an articulated manner. In some embodiments, a rubber element or a rubber lip forms a joint or a combination of one or more mechanically supporting joints that absorbs vertical forces, repels dirt, and blocks light. Among these embodiments are those in which the tie bar or a vertical frame element of the first panel is connected in an articulated manner to the processing module, with the adjacent first panel being connected rigidly, i.e. in an immobile manner, to the tie bar or frame element.

A second panel is arranged directly against the first panel. This second panel is connected in an articulated manner to the first panel, to which end similarly to the first embodiment, one or more suitable joints or a hinge suffice, or rubber elements or lips alone or in combination can be used as panels. The joint is naturally configured such that it is adapted to the load it is to take. The connector can now be directly arranged on the second panel. It is now possible to provide a third or even more panels, which as previously mentioned are connected to each other in an articulated manner, wherein the at least one connector is arranged on the in each case last panel. However, two panels are preferably provided, that can move relative to each other.

Due to the articulated connection, the panels can be swiveled from the blocking position into a rest position and folded onto each other. In the rest position, the inter-module gap is open so that it becomes possible to service internal components. This provides a clear advantage since the panel arrangement is simply folded away without the need to push it upwards and hold it there with additional measures. And with the dismantling of the modules, the panel arrangement fixed on them is also completely removed so that the processing machine is optimally accessible.

The panels of the panel arrangement can have dimensions that are identical or different. In particular, the longitudinal extension of the panels can be made the same size or different sizes. For example, the first panel may be wider than the second panel.

To be able to actuate the panel arrangement, it is sufficient for only one of the panels to have an actuation element. In some embodiments, the actuation element is a rod handle.

The connectors arranged opposite to secure the tie bar and the corresponding counter-connectors maintain the screen in a stable position as it closes the inter-module gap. In some embodiments, the connector is a permanent magnet. In other embodiments, the connector is an electrical safety switch having an interlock. Among these embodiments are those in which an electromagnet having an electrically excitable coil implements the interlock. Such a connector locks with a counter-connector. In some embodiments, the counter-connector is either a magnetizable component or a permanent magnet.

In some embodiments, there is only a single connector with a corresponding counter-connector arranged in a corresponding position on the other adjacent processing module. Among these are embodiments in which the connector is arranged on a lower region of the panel arrangement.

In some embodiments, the counter-connector is arranged on a corresponding holder that is arranged on the processing installation. Among these are embodiments in which the holder is a tie bar that is also arranged on the processing module to form a corresponding stop on a front face of the panel arrangement.

In another arrangement, the connector is arranged on a free front face of the panel arrangement on a self-adjusting carrier element mounted thereon.

In some embodiments, the connector is a self-adjusting connector. Among these embodiments are those in which the connector is mounted in a mobile manner on the panel arrangement. One implementation of such a mounting relies on a rubber bearing that is arranged between the panel and the connector, or between the panel and the electrical safety switch that forms the connector.

In some embodiments, a holder holds the connector, or the safety switch. The holder is arranged such that it can move on the panel arrangement, i.e. on the corresponding panel. In an alternative embodiment, the counter-connector is alone or still held or mounted in a self-adjusting manner.

In one aspect, the invention features a container-processing installation having a carousel with processing modules disposed around a periphery thereof, each pair of adjacent processing modules being separated a screened gap. The screen that screens this gap is a multi-part panel arrangement having a first panel mounted to a processing module such that it can swivel and a second panel having a connector mounted thereon. This connector interacts with a counter-connector that is either on an adjacent second processing module or on the container-processing installation.

In some embodiments, the panel arrangement extends over a greater length than a width of the gap.

Embodiments include those in which the panel arrangement is arranged on the container-processing installation, and those in which it is arranged on the processing module. In the former case, the panel arrangement swivels in one direction relative to the container-processing installation, whereas in the latter case, the panel arrangement swivels in one direction relative to the processing module.

Also among the embodiments are those in which the panel arrangement further comprises a tie bar to which the first panel connects in an articulated manner. Among these embodiments are those in which the tie bar is arranged on the processing module and those in which it is arranged on the container-processing installation.

In other embodiments, the first and second panels connect to each other in an articulated manner.

Yet other embodiments include a joint between the two panels. The joint includes a rubber lip secured to the first and second panels.

In some embodiments, the panel arrangement swivels between a blocking position and a rest position. In the blocking position, the screen screens the gap; whereas in the rest position, it doesn't.

In some embodiments, the connector comprises an electrical safety switch having an interlock or a permanent magnet. In either case, there are embodiments which the counter-connector comprises a magnetic elbow, those in which it comprises a magnetizable elbow, and those in which it comprises a tie bar.

Further embodiments include those in which the connector is arranged on a lower region of the panel arrangement and those in which it is arranged on a lower region of the second panel.

Also among the embodiments are those in which either or both of the connector or the counter-connector is self-adjusting.

Container-processing installations can take the form of filling machines, labelling machines, inspection machines, and rinsers. In a labelling machine, processing modules are arranged as labelling modules that put labels on the containers or as aligning modules that align containers so that the labels can always be applied on the containers in the same orientation and in the same position. It is also possible for multiple labelling modules to be provided. In such cases, one module applies labels on the bottle's front-belly region, another on the bottle's back-belly region, and yet another on the bottle's neck region. Further processing modules in a labeling machine are inspection modules that check that the labels applied are positioned correctly with no kinks. These processing modules are then arranged along the carousel's peripheral direction, i.e. around the rotary table.

Containers can include bottles for liquids, such as for drinks. The containers, for example bottles, can be made of a transparent or translucent material, for example of glass or a translucent plastic, e.g. PET. It is also feasible for the containers to be made of other materials and that they can be filled with other contents. As used herein, preforms, which are objects that have not yet been but are intended to be formed into containers are also deemed to be containers.

The invention includes combinations of the foregoing features.

DETAILED DESCRIPTION

These and other features of the invention will be apparent from the following detailed description and the accompanying figures, in which:

FIG. 1 a section of a container-processing installation in a perspective partial view;

Figure 1:
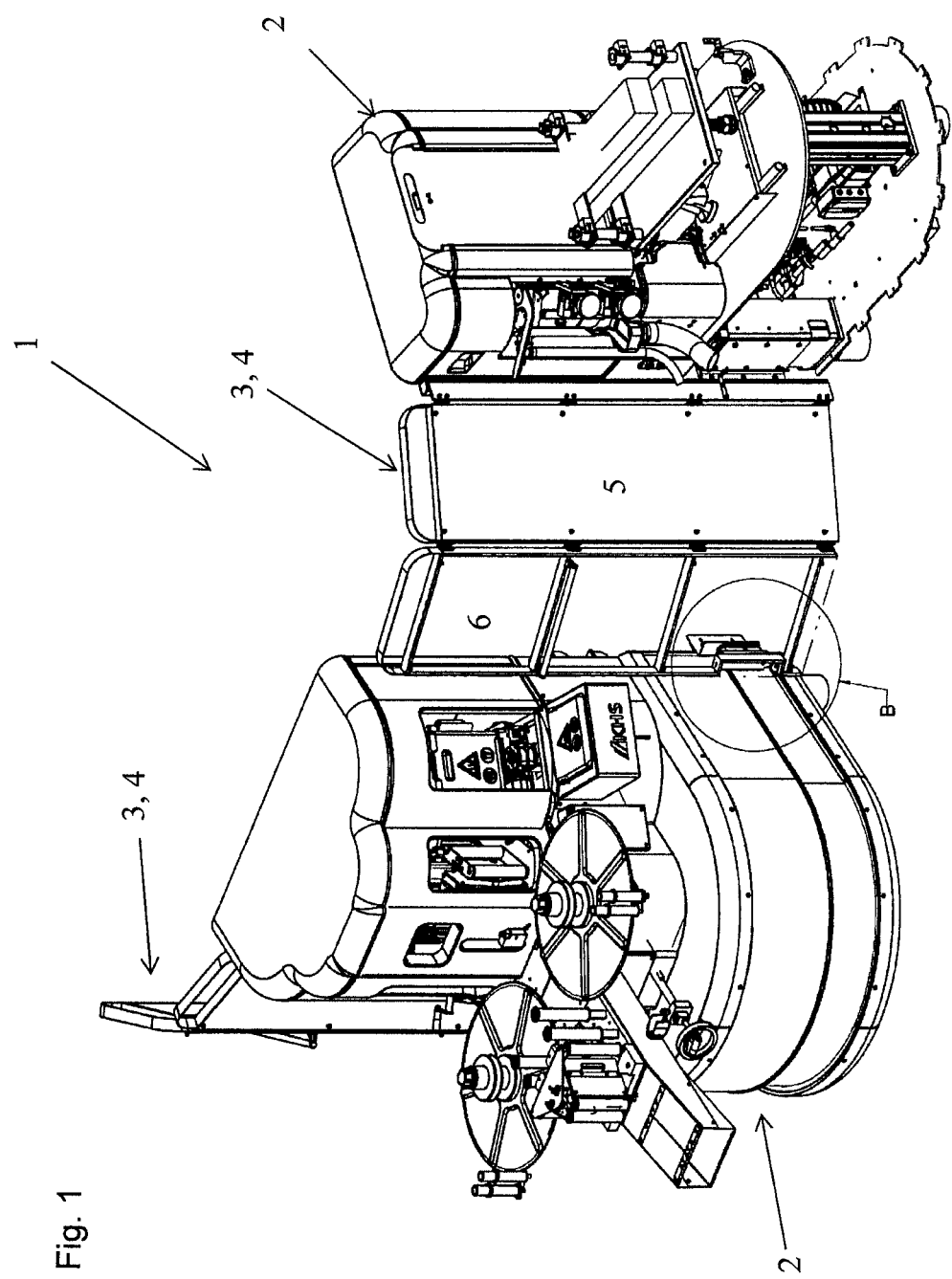
Figure 5:
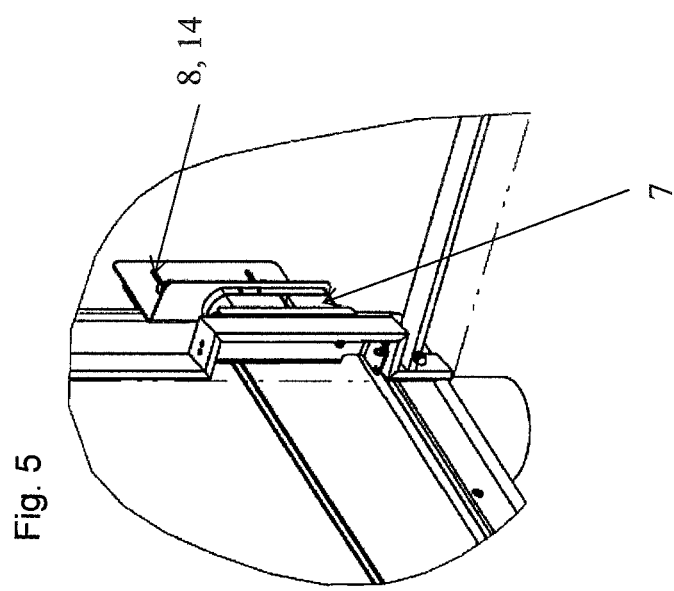
Figure 6:
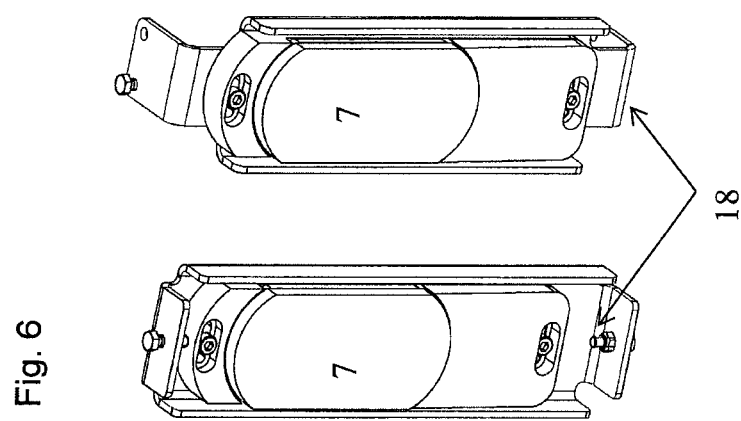

FIG. 5 a magnification from FIG. 1 showing a connector with its associated counter-connector;

FIG. 6 shows the connector of FIG. 5 in greater detail; and

FIG. 7 shows details associated with securing on a tie bar, and by means of a connector.

In the various figures, the same parts are always given the same reference symbols, and hence they are generally also only described once.

DETAILED DESCRIPTION

FIG. 1 shows a container-processing installation 1 that has processing modules 2 arranged around a carousel. The carousel itself has been omitted for clarity. Between each pair of processing modules 2 is an inter-module space. A screen 3 fills this inter-module space.

The screen 3 is a multi-part panel arrangement 4 having first and second panels 5, 6. In some embodiments, the first and second panels 5, 6 are transparent. This can be achieved by use of MAKROLON® or PLEXIGLAS®.

Each of the first and second panels 5, 6 extends along a vertical direction and a horizontal direction. The extent along the vertical direction is the panel's "height" and the extent along the horizontal direction is the panel's "width."

Figure 3:
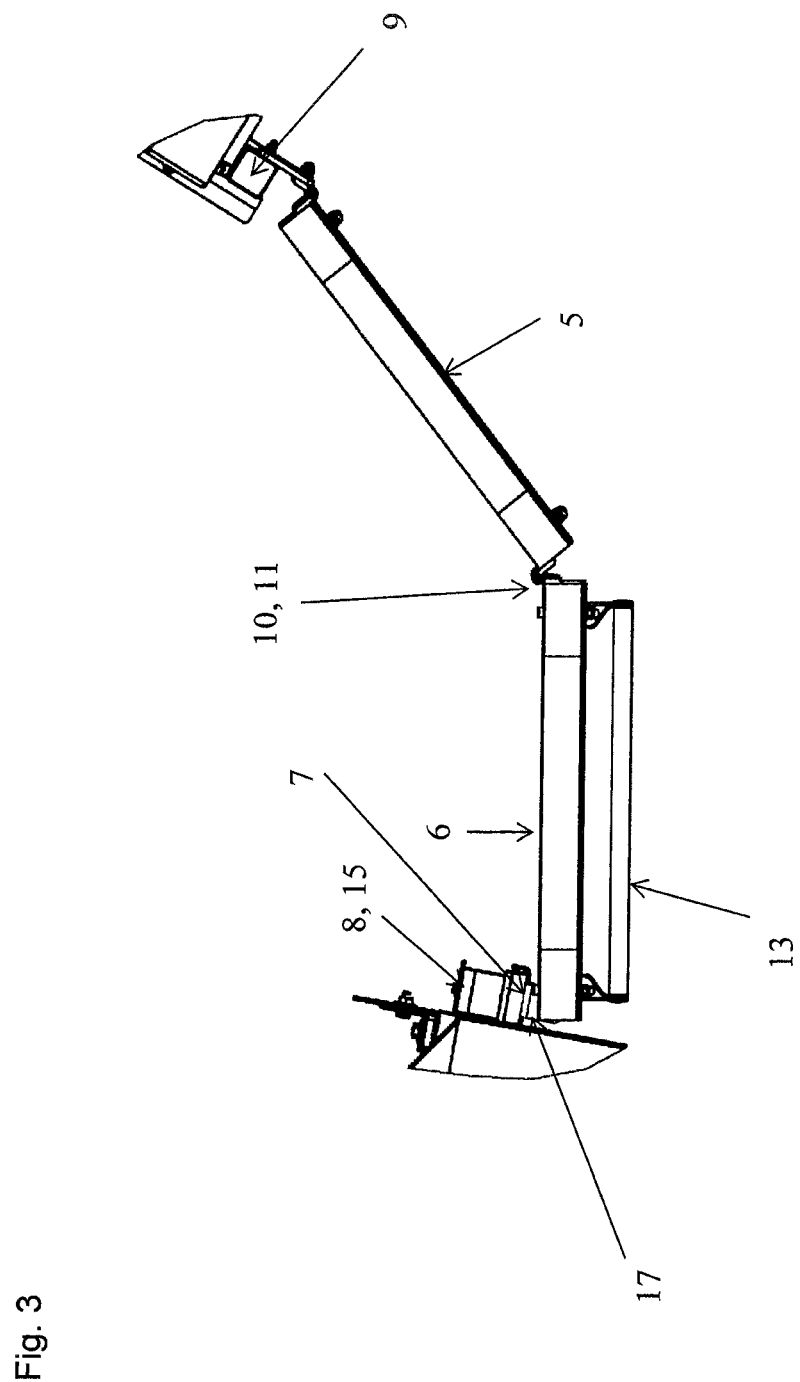
FIG. 3 is magnified portion of FIG. 2 showing a panel arrangement as seen from above.

One side of the first panel 5 connects to a processing module 2. Referring now to FIG. 3, the second panel 6 has a connector 7 that interacts with a corresponding counter-connector 8. As is best seen in FIGS. 5 and 7, the counter-connector 8 is arranged on another directly adjacent processing module 2.

Figure 2:
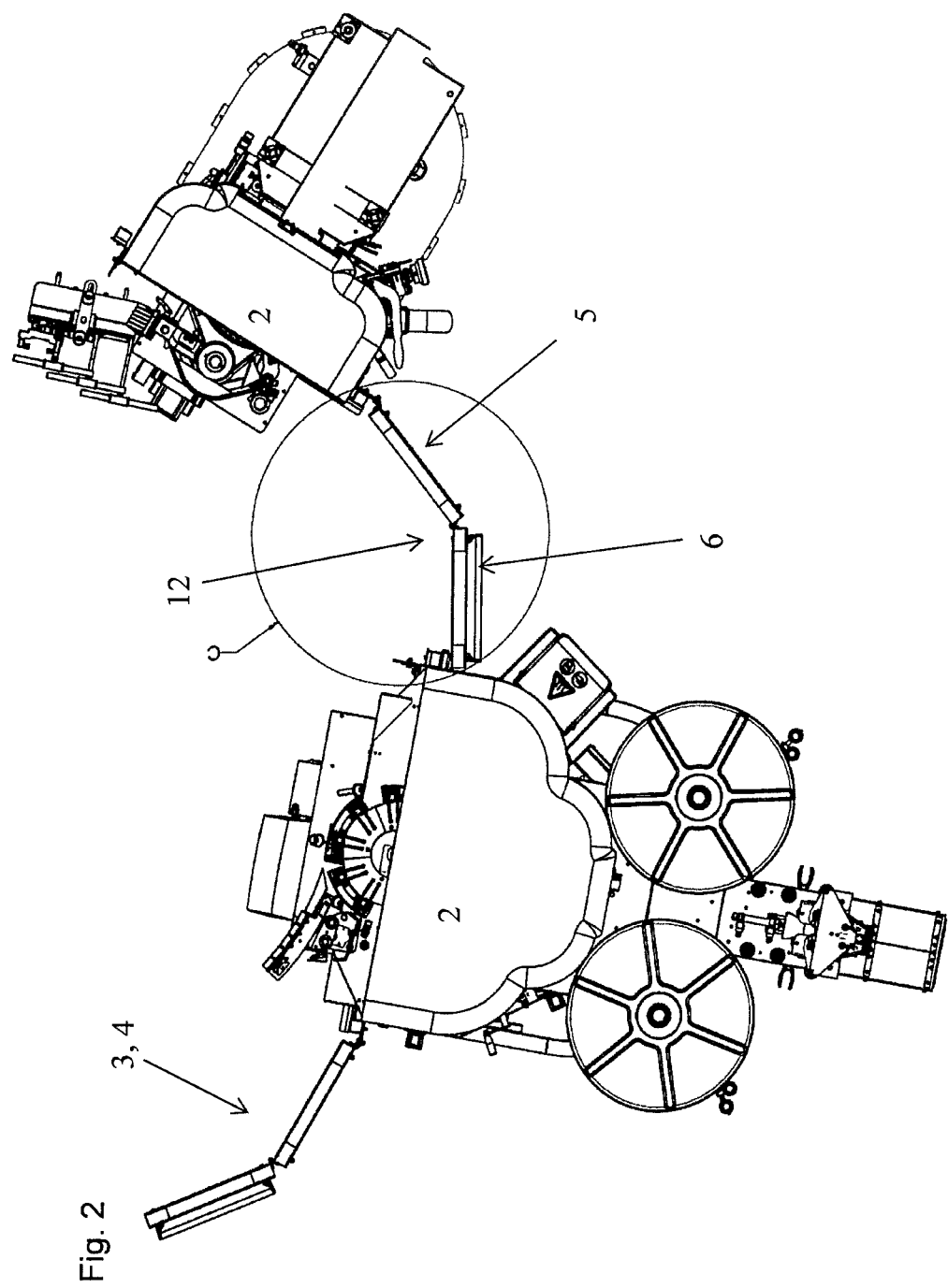
FIG. 2 shows a view from above the section shown in FIG. 1.

As can be seen in FIGS. 1 to 3, the panel arrangement 4 is arranged on the processing module 2 so that it pivots in one direction.

The panel arrangement 4 is too wide to fit in the inter-module space between processing modules 2 when it is fully extended. Accordingly, when installed, the first and second panels 5, 6 of the panel arrangement 4 form an angle relative to each other, as shown in FIGS. 1-3.

The panel arrangement 4 includes a tie bar 9, best seen in FIG. 3, to facilitate the one-sided pivotable connection between the panel arrangement 4 and the processing module 2. The tie bar 9 is secured rigidly to the processing module 2, for example by screwing the tie bar 9 to the processing module 2. The arrangement of the tie bar 9, the counter-connector 8, and the connector 7 causes the panel arrangement 4 to maintain a stable position that fills the inter-module gap and thus isolates the space within the carousel.

The first panel 5 connects to the tie bar 9 in an articulated manner, as shown in FIG. 3. The second panel 6 is arranged adjacent to the first panel 5 with a joint 10 providing an articulated connection between the first and second panels 5, 6. A rubber lip 11, which is secured to both the first and second panels 5, 6, extends along the height of the first and second panels 5, 6. The connector 7 is directly arranged on the second panel 6. As a result of the articulated connection, the first and second panels 5, 6 can be swiveled from a blocking position 12, as shown in FIG. 1, into a rest position in which they are folded against each other.

Figure 4:
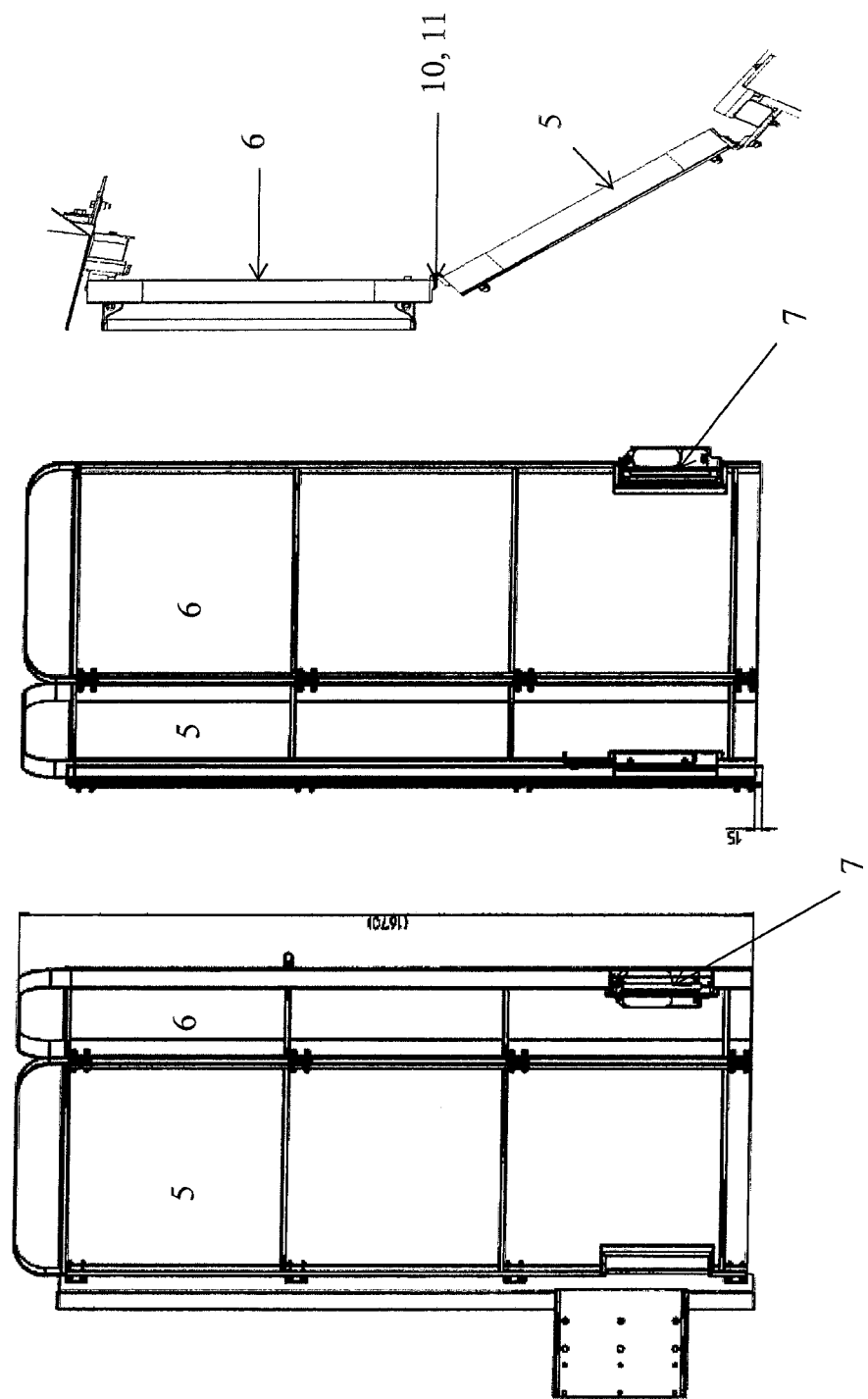
FIG. 4 shows alternative panel arrangements in which the two panels have the same or different widths.

The dimensions of the first and second panels 5, 6 can be identical or different. For example, the right-hand portion of FIG. 4 shows first and second panels 5, 6 having the same width. The central portion of FIG. 4 shows a second panel 6 having a width greater than that of the first panel 5. The left-hand portion of FIG. 4 shows a second panel 6 having a width smaller than that of the first panel 5.

The tie bar 9 secures the first panel 5 to the processing module 2. A rod handle 13, which can be seen in FIG. 3, serves as an actuator for actuating the panel arrangement 4. Only one rod-handle 13 is required to actuate the panel arrangement 4. In the illustrated embodiment, the rod handle 13 is on the second panel 6. However, in other embodiments, the rod handle 13 is on the first panel 5.

An advantageous feature is that only one mounting is needed to guide the panel arrangement 4 as it pivots. The tie bar 9 serves as this mounting. In some embodiments, there is also a bearing on the top circumferential periphery of the container-processing machine 1. Such a bearing is arranged vertically relative to the mounting.

For each panel arrangement 4, it is enough to have one connector 7 with its corresponding counter-connector 8 arranged in a corresponding position on a directly adjacent processing module 2, as can best be seen in FIGS. 5 to 7. In some embodiments, the connector 7 is arranged on a lower region of the panel arrangement 4.

The counter-connector 8 can be implemented as a magnetic elbow 14, as shown in FIG. 5. However, the counter-connector 8 can also be arranged on a holder 15 that is arranged on the processing installation 2, as shown in FIG. 7.

In the embodiment shown in FIG. 7, the holder 15 is implemented a tie bar 9. The holder 15 is arranged on the processing module 2 to form a corresponding stop on the front face seen in the vertical direction of the panel arrangement 4, as shown in FIG. 7.

In some embodiments, the connector 7 is an electrical safety switch. In these embodiments, the counter-connector 8 is a magnetizable section or permanent magnet on the tie bar 9.

In a preferred arrangement, the connector 7 is a safety switch that is arranged in such a way on a free front face 16 of the panel arrangement 4. In particular, as shown in FIG. 7, the connector 7 is arranged as on the free front face 16 of the second panel 6.

A rubber bearing 17 arranged between the second panel 6 and the connector 7 ensures its ability to move relative to the panel arrangement 4. As a result of this mobility, the connector 7 is self-adjusting.

In the embodiment shown in FIG. 6, a holder 18 that is arranged so that it can move relative to the panel arrangement 4 holds the connector 7. The illustrated holder 18 is movably mounted to the free front face 16 of the second panel 6. This too provides the mobility needed to ensure that the connector 7 is self-adjusting.

One way to open the inter-module space is to fold back or pivot the first and second panels 5, 6. Another way to open the inter-module space is to dismantle the panel arrangement 4. To do so, only a tie bar 9 needs to be released.

In some cases, it may become necessary to interchange the processing modules 2. When this is carried out, the panel arrangement 4 can be removed and fitted on the new module. Alternatively, the panel arrangement 4 can remain on a particular interchangeable processing module 2. This saves assembly and dismantling time.

In some cases, interchanging processing-modules 2 can change the inter-module gap. However, since the first and second panels 5, 6 are arranged to form an angle between them, it is possible to adjust for different inter-module gaps by changing this angle. This means that even though the dimension of the inter-module space changes, the panel arrangement 4 still provides reliable screening.

In some embodiments, multiple first panels 4 are arranged around a rotary table to fully screen the container-processing installation 1.

Having described the invention, and a preferred embodiment thereof, what is claimed as new, and secured by Letters Patent is:

1. An apparatus comprising a container-processing installation, said container processing installation is selected from the group consisting of a filling machine, a labelling machine, an inspection machine and a rinser, and wherein said container-processing installation processes containers selected from the group consisting of bottles and preforms for forming bottles, said container-processing installation comprising, processing modules, a gap, and a screen comprising a multi-part panel arrangement, said multi-part panel arrangement comprising a first panel, a second panel, a connector, and a counter-connector, wherein said first and second panels extend vertically, wherein said processing modules are configured to be disposed around a peripheral circumference of a carousel, wherein said processing modules comprise first and second processing modules that are adjacent to each other and separated by said gap, wherein said screen screens said gap to prevent containers that have come loose from said carousel from being slung outward through said gap, wherein said screen comprises said multi-part panel arrangement, said connector, and said counter-connector, wherein said multi-part panel arrangement comprises said first and second panels, wherein said first panel is mounted to said first processing module such that said first panel can swivel, wherein said connector is on said second panel, wherein said connector interacts with said counter-connector, and wherein said counter-connector is arranged on said second processing module.

2. The apparatus of claim 1, wherein said multi-part panel arrangement is a rectangular arrangement that, greater length than a width of said gap, when fully extended, is too wide to fit in said gap.

3. The apparatus of claim 1, wherein said panel arrangement is arranged on said container-processing installation and wherein said panel arrangement is configured to swivel in one direction relative to said container-processing installation.

4. The apparatus of claim 1, wherein first and second panels are configured to be swiveled between a blocking position and a rest position, wherein, when swiveled into said blocking position, said first and second panels isolate a space within said carousel from a space beyond said carousel, wherein, when in said rest position, said first and second panels are folded against each other.

5. The apparatus of claim 1, wherein said multi-part panel arrangement further comprises a tie bar that differs from said counter connector, and wherein said first panel is connected in an articulated manner to said tie bar.

6. The apparatus of claim 1, wherein said first panel is connected in an articulated manner to a tie bar that is arranged on said processing module, wherein said tie bar differs from said counter connector.

7. The apparatus of claim 1, wherein, in addition to said counter connector, said apparatus comprises a tie bar that is arranged on said container-processing installation and that is connected in an articulated manner to said first panel.

8. The apparatus of claim 1, wherein said processing modules are labeling machines.

9. The apparatus of claim 1, further comprising rubber lip and a joint between said first and second panels, wherein said joint comprises said rubber lip, and wherein said joint is secured to said first and second panels.

10. The apparatus of claim 1, wherein said first and second panels are configured to be swiveled between a blocking position, in which said screen first and second panels isolate a space within said carousel from a space beyond said carousel, and a rest position, in which said first and second panels are folded against each other.

11. The apparatus of claim 1, wherein said connector comprises an electrical safety switch having an interlock and wherein the counter-connector comprises a magnetic elbow.

12. The apparatus of claim 1, wherein said connector comprises an electrical safety switch having an interlock and wherein the counter-connector comprises a magnetizable elbow.

13. The apparatus of claim 1, wherein said connector comprises an electrical safety switch having an interlock and wherein the counter-connector comprises a tie bar.

14. The apparatus of claim 1, wherein said connector comprises a permanent magnet and wherein said counter-connector comprises a tie bar.

15. The apparatus of claim 1, wherein said connector comprises a permanent magnet and wherein said counter-connector comprises a magnetic elbow.

16. The apparatus of claim 1, wherein said connector comprises a permanent magnet and wherein said counter-connector comprises a magnetizable elbow.

17. The apparatus of claim 1, wherein said processing modules are inspection machines.

18. The apparatus of claim 1, wherein at least one of said first and second panels is transparent.

19. The apparatus of claim 1, further comprising a rubber bearing, wherein said rubber bearing is arranged between said second panel and said connector, and wherein said connector is self-adjusting.

20. The apparatus of claim 1, further comprising a holder that is arranged to move relative to said multi-panel arrangement, wherein said holder holds said connector, wherein, as a result of mobility of said holder said connector is self-adjusting.

21. The apparatus of claim 1, wherein said first and second processing modules that are adjacent to each other are always separated by said gap, wherein said gap does not change in size over time.

22. The apparatus of claim 1, wherein adjacent ones of said processing modules are separated by said gap, wherein said gap remains the same size over time.

* * * * *